Patented Feb. 3, 1953

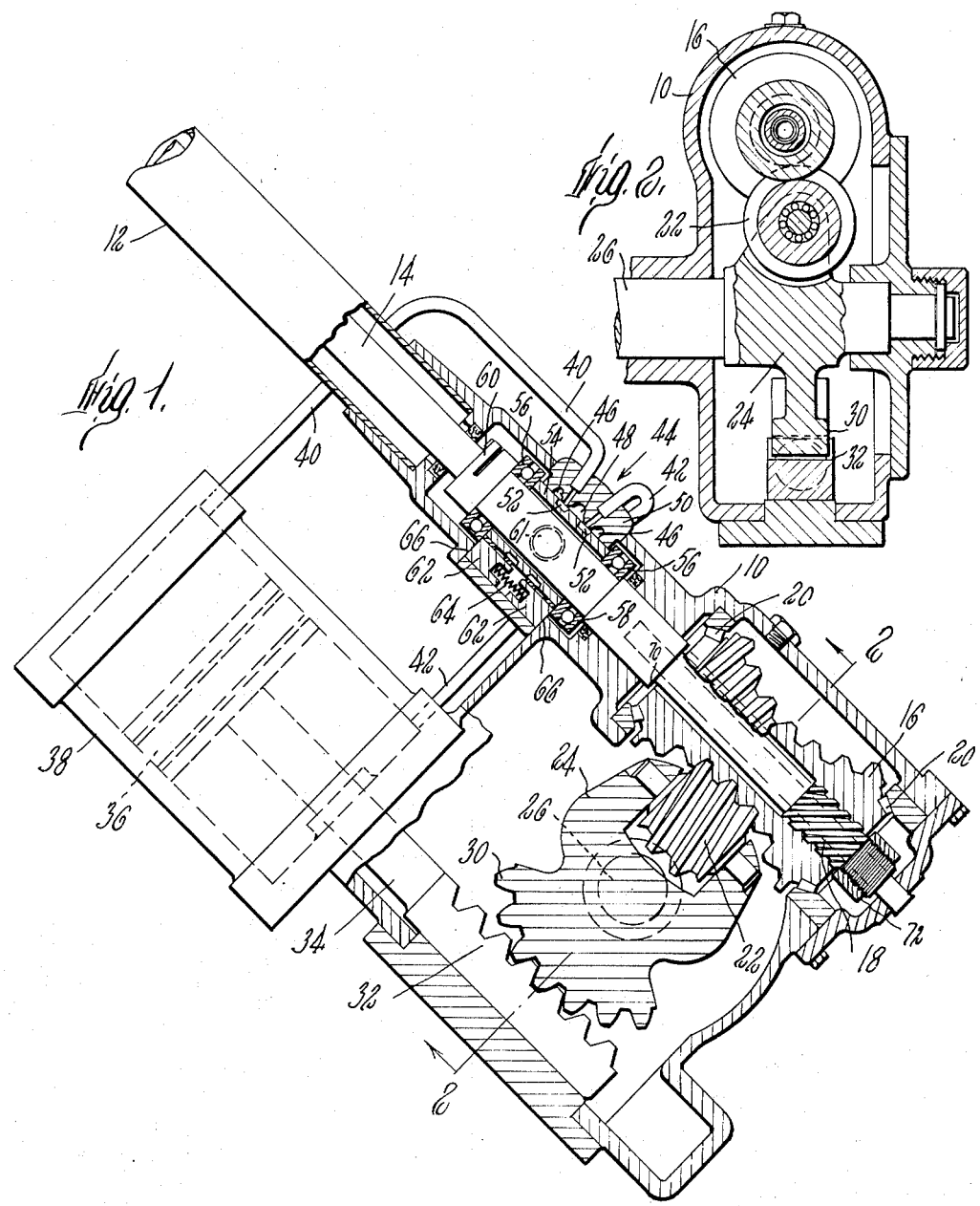

2,627,187

UNITED STATES PATENT OFFICE 2,627,187

POWER STEERING GEAR

Francis W. Davis, Belmont, Mass.

Application October 20, 1951, Serial No. 252,246

8 Claims. (Cl. 74—388)

This invention relates to improvements in power steering mechanisms such as are used on motor-driven land vehicles, and more particularly to improvements in the steering mechanism illustrated and described in my U. S. Patent No. 2,213,271, granted September 3, 1940. The mechanism shown in the patent includes a worm fixed on the steering shaft which carries the steering wheel and on which is mounted the inner member of a sleeve valve to control the supply of power fluid to the steering motor. The worm in the patented mechanism meshes with a gear section operatively connected to linkage which deflects the vehicle wheels to determine the course of the vehicle. According to the present invention the worm is positively held against any axial movement relative to the housing or frame in which it is mounted, and the worm can be and preferably is of the hour-glass type, that is, with a diameter varying from a minimum at its mid point to a maximum at both extremities. To provide for the operation of the control valve, the steering shaft, on which is mounted one of the valve members, projects into a longitudinal bore in the worm, the portion of the shaft within the bore being screw-threaded and in threaded engagement with the interior of the worm, whereby any relative rotation between the shaft and worm results in axial movement of the shaft relative to the housing or frame, since the worm is held against such movement. According to the invention, the screw thread which connects the shaft and worm is preferably made with a steep pitch, that is, considerably steeper than the pitch of the thread on the exterior of the worm. This gives reversability of action between the shaft and worm. The effect of this is to increase the distance of axial movement of the shaft resulting from a given angular movement thereof relative to the worm. This increase in axial movement has a corresponding effect on the operation of the control valve because the amount of opening or closing of the valve ports depends on the amount of axial movement of the shaft. This means increased sensitivity of response in the operation of the valve.

For a more complete understanding of the invention reference may be had to the following description thereof and to the drawings of which Figure 1 is a side elevation of a mechanism embodying the invention, portions being broken away to show the moving parts in section; and Figure 2 is a section on line 2—2 of Figure 1.

The drawing illustrates a steering mechanism which is mounted in the frame or housing 10. From this frame a steering column 12 extends up to the steering wheel (not shown). In the steering column is a steering shaft 14 which is rotatable and is also axially movable, the range of axial movement being limited to a few thousandths of an inch. The lower portion of this shaft extends through a hollow worm 16 which, as shown, is of the hour-glass type. The steering shaft 14 is mechanically connected to the worm 16 by means of a screw threaded portion 18 which meshes with a corresponding interior thread within the bore of the worm 16. The thread or helix 18 has preferably a steep pitch, a 45° pitch being illustrated on the drawing. This pitch is considerably greater than the pitch of the exterior threads of the worm 16. Any relative rotation between the worm 16 and the shaft results in axial movement of the latter since the worm is positively held against any axial movement by means of suitable bearings such as the roller bearings 20 shown in the drawing. The worm meshes with a cam roller 22 carried by a gear sector member 24. This member is fixed on a rock shaft 26 which is journalled in the housing 10 and is operatively connected through suitable linkage to the vehicle wheels (not shown). The member 24, in addition to the cam roller 22 which meshes with the worm 16, has a gear sector 30 which meshes with a rack 32 on the end of a piston rod 34. The rod 34 extends from a piston 36 reciprocable in a fluid motor cylinder 38. The introduction of fluid under pressure into the cylinder 38 results in pressure against the piston 36 tending to move it in one direction or the other depending on which end of the cylinder receives the pressure fluid.

The pressure fluid is supplied to the opposite ends of the cylinder by means of suitable pipes or ducts 40 and 42 which lead from a control valve indicated at 44. This valve is preferably similar to that described and illustrated in my Patent No. 2,213,271 and may be connected by suitable pipes or ducts to a pump, reservoir and by-pass relief valves in the manner shown and described in my Patent No. 2,007,423.

Valve 44 includes grooves 46 and 48 in the interior of a tubular member 50 which may be a part of the frame or housing 10. Cooperating with the grooves 46 and 48 are grooves 52 on the exterior of the sleeve 54 which is carried on the shaft 14 but does not rotate. The sleeve is confined between ball bearing races 56 which in turn bear respectively against a shoulder 58 on the steering shaft and nut 60 which is screw-threaded on the shaft. Thus the valve sleeve 50 partakes of any axial movement of the shaft 14 but does not rotate when the shaft rotates. The grooves 52 are constantly in communication with the ducts 40 and 42 and are located between the groove 48 and the grooves 46. The groove 48 is connected to an inlet 61 by which fluid under pressure, preferably oil, is supplied to the valve. The grooves 46 are connected to a return pipe (not shown) which leads back to the pump section or reservoir so that oil can be continuously circulated. When the valve sleeve 54 is in its neutral position as illustrated in Figure 1, the grooves 52 slightly overlap the edges of the grooves 46 and 48 providing clearances through which oil which flows in through the groove 48 can flow freely into both grooves 52 and thence out through the grooves 46. This results in low, balanced pressures in the chambers in the cylinder 38 and in very little load on the pump. When the sleeve 54 is axially moved in one direction or another from its neutral position, the opening between the supply groove 48 and one of the grooves 52 is widened while the opening between the supply groove 48 and the other groove 52 is correspondingly narrowed. Simultaneously the opening between the first groove 52 and the discharge groove 46 is narrowed while the opening between the second groove 52 and the adjacent discharge 46 is correspondingly widened. This results in a building up of pressure in the end of the chamber 38 corresponding to the groove 52 which has been opened to the inlet groove 48.

This unbalanced pressure in the cylinder tends to move the piston and consequently to rock the gear sector member 24 in a direction to rotate the worm 16 to catch up with the shaft and restore their customary relative position.

Axial movement of the sleeve 54 is yieldingly opposed by a set of two or more preloaded spring pressed devices, one of which is illustrated in Figure 1 of the drawing, these devices being distributed around the shaft 14. Each device consists of a pair of plungers 62 which are pressed apart by a compressed spring 64. The mutually remote ends of the plungers 62 bear against the ball bearing races 56 and also against shoulders 66 of the casing 10. The springs 64 are constantly under compression so that any movement of either plunger 62 away from its shoulder 66 will have to be caused by sufficient force to overcome the initial compression of the springs 62. Thus the shaft 14 is held against any axial movement until such force is impressed thereon.

When the steering mechanism is in use, rotation of the shaft 14 results in rotation of the worm 16 and this ordinarily results in rocking movement of the gear sector member 24 so that the vehicle wheels are accordingly deflected. If however the resistance to steering effort exceeds a predetermined magnitude so that worm 16 is prevented from following the rotation of the shaft 14, then the shaft rotates relatively to the worm and thus moves axially by reason of the helix 18 which connects the shaft mechanically to the worm 16. This axial movement of the shaft results in a similar axial movement of the valve sleeve 54 which directs power fluid into the cylinder 38 in such a manner as to cause the piston 36 to rock the gear sector member 24. This rocking movement not only deflects the vehicle wheels but also it acts through the roller cam 22 to rotate the worm 16 in a direction to restore the shaft 18 to its neutral position relative to the worm. This also restores the valve sleeve 54 to its neutral position and balances the fluid pressure in the cylinder 38.

The steep pitch of the helix 18 which connects the steering shaft 14 with the worm 16 results in an increased sensitivity in the action of the valve since for a given angle of relative rotation between the shaft and worm there is a greater axial movement on the part of the shaft than there would be if the shaft were fixed to the worm and the worm were allowed to move axially with the shaft.

In case of failure of the power, the mechanism is used as an ordinary hand-steering gear. If road resistance is sufficient to overcome the force of the centering springs 64, the resulting axial movement of the steering shaft 14 relative to the worm 16 is limited by the engagement of a shoulder 70 on the shaft with the upper end of the worm, or by engagement of a nut 72 on the shaft with the lower end of the worm. The clearances between the ends of the worm and the shoulder 70 and nut 72 are less than those between the ball-bearing members 56 and the ends of the valve housing 50, so that the axial thrusts of the steering shaft incidental to hand-steering without power are taken by the strongly mounted worm 16 rather than by the valve casing and ball-bearings.

I claim:

1. In a power steering mechanism, a frame, a hollow worm mounted in said frame for rotation therein, means holding said worm from axial movement relative to said frame, a shaft coaxial with said worm, said shaft having a portion in screw-threaded engagement with the interior of the worm, whereby relative rotation between the worm and shaft results in axial movement of the shaft, a worm-gear sector member mounted on said frame in mesh with said worm for movement in response to rotation of said worm, a fluid motor operatively connected to said gear sector member, a control valve operable by axial movement of said shaft to direct power fluid to said motor, and ducts connecting said control valve to said motor.

2. Mechanism as in claim 1, said hollow worm being of the hour-glass type.

3. Mechanism as in claim 2, said worm-gear sector member being rockably mounted in said frame.

4. Mechanism as in claim 3, said worm-gear sector member having a second gear sector, said fluid motor including a piston rod, and a gear rack on said piston rod meshing with said second gear sector.

5. Mechanism as in claim 3, said worm-gear sector member including a body member and a roller cam rotatably mounted on the body member, said roller cam having a screw thread meshing with said worm.

6. Mechanism as in claim 1, the interior screw-thread of the hollow worm having a substantially greater pitch than the worm itself.

7. Mechanism as in claim 1, and pre-loaded spring means yieldingly opposing axial movement of said shaft in either direction to said frame from an intermediate neutral position.

8. Mechanism as in claim 7, said worm and shaft having stop elements for positively limiting the axial movements of the shaft relative to the worm.

FRANCIS W. DAVIS.

No references cited.